United States Patent

[11] 3,600,038

| [72] | Inventors | Marcus J. Jones;<br>William Michaluk, both of Winnipeg,<br>Manitoba, Canada |
|---|---|---|
| [21] | Appl. No. | 869,134 |
| [22] | Filed | Oct. 24, 1969 |
| [45] | Patented | Aug. 17, 1971 |
| [73] | Assignee | C. & S. Jones Limited<br>Winnipeg, Manitoba, Canada |

[54] DUMPING ATTACHMENT FOR PANEL TRUCKS
1 Claim, 5 Drawing Figs.

[52] U.S. Cl. ..................................................... 298/22 P,
    298/17 R
[51] Int. Cl. ..................................................... B60p 1/16
[50] Field of Search........................................... 298/22, 22
    P, 22 A, 22 D, 1, 10, 11, 17, 18; 214/500—502

[56] References Cited
UNITED STATES PATENTS

| 2,640,725 | 6/1953 | Dale ............................. | 298/22 P |
| 2,234,135 | 3/1941 | Barrett ......................... | 298/22 |
| 2,436,017 | 2/1948 | Powers ......................... | 298/22 |

*Primary Examiner*—Milton Buchler
*Assistant Examiner*—F. K. Yee
*Attorney*—Kent and Ade ABSTRACT: A pair of downwardly depending rear hangers one at each rear end of the chassis members, carry hydraulic piston and cylinder assemblies which extend forwardly to a subframe upon which the panel truck body is mounted. The subframe is pivoted to the chassis at the rear end thereof and lies flush with the chassis when down because the longitudinal members of the subframe lie on the outside of the two chassis longitudinal members.

PATENTED AUG 17 1971  3,600,038

INVENTOR.
Marcus J Jones
William Michaluk

By Kent & Ade
AGENTS 3,600,038

DUMPING ATTACHMENT FOR PANEL TRUCKS

This invention relates to new and useful improvements in hoist mechanisms for panel trucks and/or express box trucks.

Normally speaking, panel trucks are not provided with hoists because present day panel trucks are styled and finished so that the body and panel truck cab present an appearance similar to passenger cars.

Panel trucks have evolved from straight forward utility trucks to trucks which can be used in commerce but can also be used for private transportation and to install hoist mechanisms on such panel trucks spoils the line completely due to the fact that all hoist mechanisms heretofore are situated above the chassis hence raising the panel truck by several inches above the chassis frame thus spoiling the lines.

Furthermore, panel truck chassis are relatively low slung so that it is difficult to install conventional piston and cylinders in positions whereby they will hoist the panel truck body effectively yet will not strike the ground when the vehicle is being driven over rough terrain.

I have overcome both of these disadvantages by providing a sub frame which is pivoted to the rear of the chassis and is adapted to lie with the longitudinal members of the subframe one upon each side of the longitudinal chassis members and in the same plane thereof, when in the lowermost position. A pair of hangers depend from the rear of the chassis and the piston and cylinder assemblies are mounted by one end thereof to the lower ends of these hangers and extend forwardly to intermediate the ends of the subframe thus giving an efficient lift angle yet at the same time not lowering the rear ends of the cylinders more than is necessary.

The principal object and essence of the invention is therefore to provide a hoist mechanism comprising a subframe and piston and cylinder assemblies which can be installed upon the chassis of a panel truck with the panel body being mounted on the subframe and which, when in the lowermost position, enables the panel body to be situated in substantially normal position thus not spoiling the lines of the vehicle.

Another object of the invention is to provide a device of the character herewithin described which is extremely simple in construction and is easily fitted to existing vehicles with the minimum of time and trouble.

When the foregoing view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying Figures in which:

In the drawings like characters of reference indicate corresponding parts in the different figures.

Figure 1:
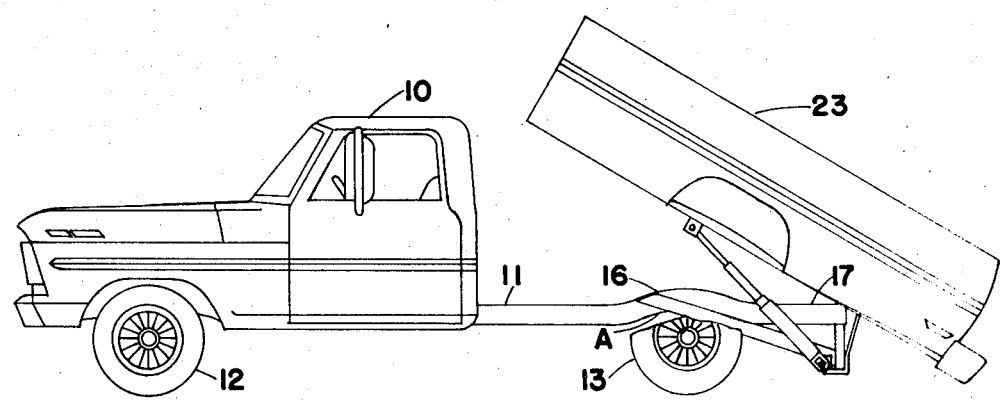
FIG. 1 is a side elevation of a panel truck with my invention therein showing the panel truck in the raised position.
Figure 3:
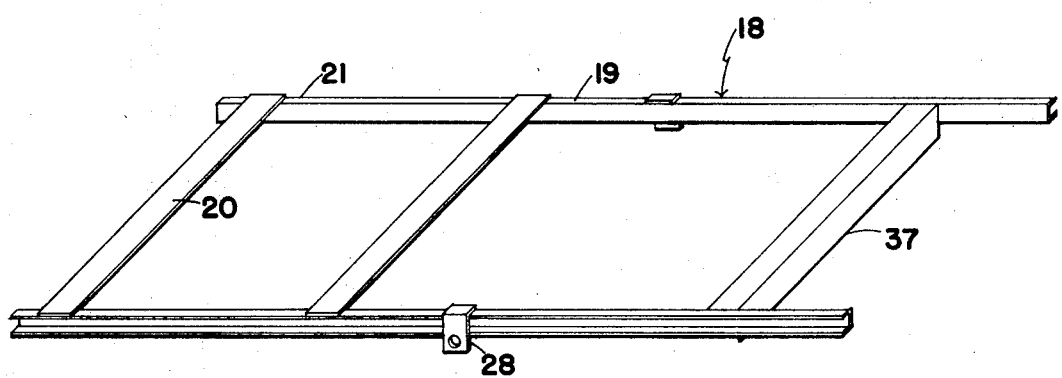
FIG. 3 is an isometric view of the subframe per se.

Proceeding therefore to describe the invention in detail, reference should first be made to FIG. 1 in which 10 illustrates the cab of a panel truck and 11 the chassis thereof mounted upon front wheels 12 and rear wheels 13.

The chassis includes a pair of longitudinal chassis members 14 maintained in spaced and parallel relationship by means of crossmembers 15 in the usual manner. Such chassis members include wheel arch portions 16 toward the rear ends 17 thereof.

A subframe collectively designated 18 includes a pair of longitudinally extending channel members 19 maintained in spaced and parallel relationship by a plurality of transversely extending crossmembers 20 and it will be observed that these members 20 are formed from flat stock and extend between the upper webs 21 of the longitudinal members 19.

Means collectively designated 22 are provided to mount the subframe pivotally to adjacent the rear end of the vehicle chassis and details of this pivotal mounting will be described later.

The panel truck body 23 is secured to the subframe in the usual way (not illustrated) and a pair of hydraulic piston and cylinder assemblies 24 react between the vehicle chassis and the subframe to raise and lower the panel truck from a position shown in FIG. 1, to the lowermost position (not illustrated).

The piston and cylinder assemblies consist of cylinders 25 with piston rods 26 extending therefrom and the ends 27 of the piston rods are pivotally secured to brackets 28 extending downwardly from the longitudinal members 19 of the subframe intermediate the ends thereof.

A cross member 29 is provided with a downwardly depending hanger 30 upon each end thereof and this crossmember is secured across the rear ends 17 of the vehicle chassis longitudinal members as by welding or by bolting.

The ends 31 of the cylinders 25 are pivotally secured to the lower ends of the hangers 30 by means of pivot pins 32.

These downwardly depending hangers provide the necessary angle of inclination for the piston and cylinder assemblies which incline forwardly and upwardly to the subframe thus permitting the subframe to be raised and lowered as the piston and cylinder assemblies are extended and retracted respectively. It will, of course, be understood that the cylinders are connected to a se of hydraulic fluid through hoses 33 in the usual manner.

Bracket members 34 extend upwardly and rearwardly from the lower ends of the hangers 30 and carry bearings 35 upon the upper ends thereof within which a shaft 36 engages. A transverse angle iron member 37 is secured to the shaft and also to adjacent the rear ends of the longitudinals 19 thus mounting the subframe for pivotal movement to the rear of the chassis as hereinbefore described.

Figure 4:
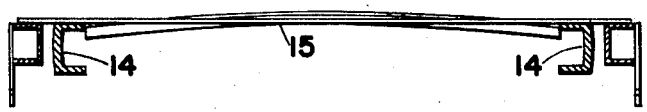
FIG. 4 is a section of the vehicle chassis and the subframe in the lowermost position.
Figure 2:
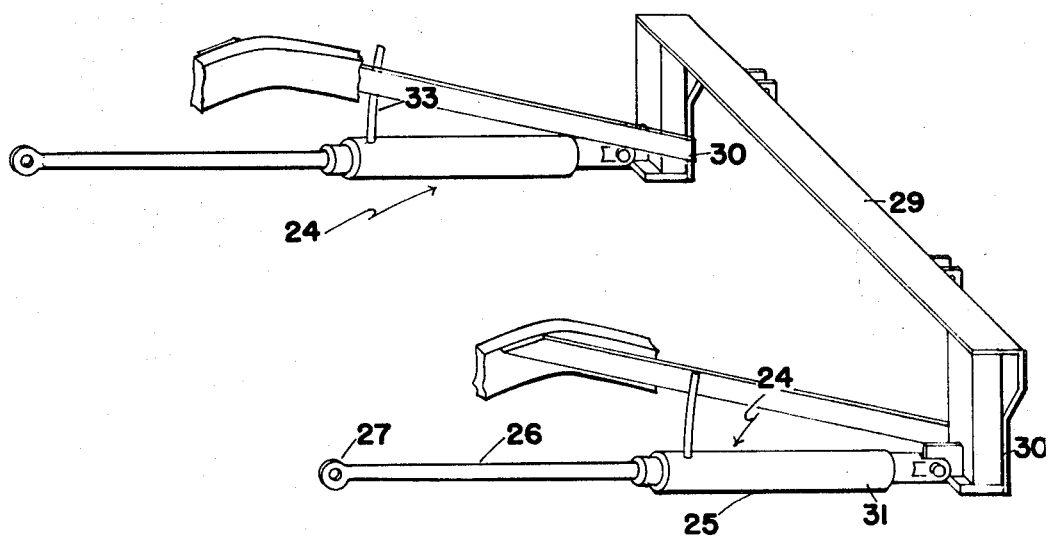
FIG. 2 is an isometric view of the piston and cylinder assemblies together with the hangers.
Figure 5:
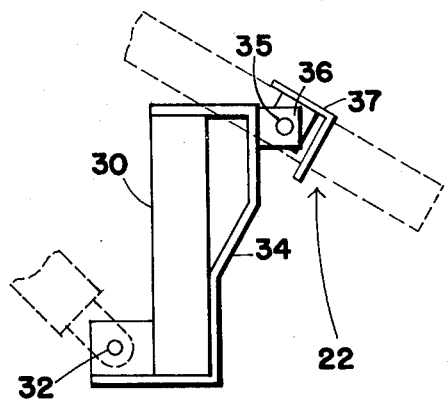
FIG. 5 is a fragmentary enlarged side elevation showing the mounting of the subframe of the chassis.

One of the essential features of the invention is the fact that the longitudinal extending members 19 of the subframe lie outside the longitudinal chassis members 14 when in the lowermost position and substantially in the same plane thereof as clearly shown in FIG. 4. This means that the panel body 23 is in the normal position when in the lowermost position thus maintaining the lines of the vehicle.

At the same time the downwardly depending hangers permit the necessary angle for the operation of the piston and cylinder assemblies 24 without the cylinders swinging downwardly to foul the ground surface.

FInally, the term panel trucks used in the specification and claims should be understood to consist of the body type often referred to as express box trucks which have side panels and a rear panel but an open top or side.

Various modifications can be made within the scope of the inventive concept which is herein disclosed and/or claimed.

We claim:

1. An attachment for converting a conventional panel truck into a dump truck where the panel truck includes a chassis having a pair of transversely spaced chassis side members and a body conventionally mounted directly on said chassis side members but removed therefrom for purposes of the conversion; said attachment comprising a cross member secured to the rear ends of the chassis side members in coplanar relation therewith, a pair of rigid hangers depending from the ends of said cross member, bracket means projecting rearwardly from the cross member, a shaft journaled in said bracket means and disposed in parallel relation with said cross member, a subframe having a rear portion mounted on said shaft for raising and lowering movement and having the panel truck body mounted directly thereon, said subframe including a pair of subframe side members which are transversely spaced by a distance greater than the transverse spacing of said chassis side members and also including flat crossbars which connect the subframe side members together, the subframe being characterized in that in its lowered position the crossbars thereof rest on the chassis side members and the side members thereof are disposed at the outside of and in the same plane as the chassis side members, and fluid operators reacting between said hangers and the intermediate portion of said subframe for raising and lowering the same.